United States Patent [19]

Shitara et al.

[11] Patent Number: 4,833,702
[45] Date of Patent: May 23, 1989

[54] TELEPHONE REGISTRATION AND CANCELLATION CONTROL IN A WIDE AREA CORDLESS TELEPHONE SYSTEM

[75] Inventors: Kenji Shitara, Tokyo; Akio Sasaki; Yoshitoshi Murata, both of Kanagawa, all of Japan

[73] Assignees: NEC Corporation; Nippon Telephone and Telegraph Corporation, both of Tokyo, Japan

[21] Appl. No.: 193,706

[22] Filed: May 13, 1988

[30] Foreign Application Priority Data

May 13, 1987 [JP] Japan ................................. 62-114494

[51] Int. Cl.⁴ .............................................. H04M 1/00
[52] U.S. Cl. ......................................... 379/60; 379/62
[58] Field of Search ....................... 379/56, 58, 59, 60, 379/61, 62, 63, 57; 455/33

[56] References Cited

U.S. PATENT DOCUMENTS

| 4,187,398 | 2/1980 | Stark | 379/59 |
|---|---|---|---|
| 4,466,001 | 8/1984 | Moore et al. | 340/825.08 |
| 4,649,385 | 3/1987 | Aires et al. | 379/57 |
| 4,680,583 | 7/1987 | Grover | 340/825.52 |
| 4,706,086 | 11/1987 | Panizza | 340/902 |
| 4,737,977 | 4/1988 | Norman | 379/59 |
| 4,768,220 | 8/1988 | Yoshihara et al. | 379/63 |
| 4,775,999 | 10/1988 | Williams | 379/59 |

Primary Examiner—Robert Lev
Attorney, Agent, or Firm—Sughrue, Mion, Zinn, Macpeak & Seas

[57] ABSTRACT

In a wide area cordless telephone system, a wide service area is divided into a plurality of local service areas identified respectively by unique codes. Each local area has home position portable cordless telephones to which telephone numbers are permanently assigned and can accommodate roaming non-home position telephones belonging to other local areas. Each telephone receives a pre-registration polling signal from one of access units located at key points and returns a pre-registration response signal if a unique code contained in the received polling signal mismatches a stored area code. A controller in each local area assigns a reserved telephone number, if available, to a roaming telephone in response to such a response signal and registers this cordless telephone in memory. The controller then transmits an acknowledgement signal indicating the completion of a registration. The registered telephone responds to it by returning a post-registration signal which is monitored by the controller. The registration of this telephone is cancelled if the controller fails to receive the post-registration signal for a prescribed time interval.

5 Claims, 6 Drawing Sheets

TELEPHONE REGISTRATION AND CANCELLATION CONTROL IN A WIDE AREA CORDLESS TELEPHONE SYSTEM

BACKGROUND OF THE INVENTION

The present invention relates to wide area cordless telephone systems, and more specifically to registration and cancellation control in a wide area cordless telephone system.

In the wide area cordless telephone system, the whole service area of the system is divided into a plurality of local service areas. In each local area, radio access units are located at several key points to establish radio links between cordless telephones and a public switched network directly or via a private branch exchange (PBX). Cordless telephones are permanently assigned unique telephone numbers of the PBX or public switched network if they remain within the boundary of their home position local area and temporarily assigned a different number whenever they roam into another local area. Assignment of the temporary telephone number requires that the system be provided with information on the current location of each cordless telephone. Each of the cordless telephones of the system must therefore be registered exclusively in one of the local areas. Whenever it moves to another local area, however, the registration must be cancelled in the source area in favor of a new registration in the destination area.

Japan Telecommunications Review, January 1979, pages 44–50 (High Capacity Automobile Telephone System) describes a method for making registration of mobile subscriber stations. According to this method, the mobile subscriber station transmits a registration request signal on crossing a boundary between two service areas, the signal being received by a mobile control station and relayed to an automobile switching center. The switching center keeps a record of each mobile subscriber station located within the own area.

SUMMARY OF THE INVENTION

The present invention provides a wide area cordless telephone which permits efficient telephone registration and cancellation in quick response to a cordless telephone crossing a boundary between adjacent service areas.

The present invention provides a wide area cordless telephone system for covering a service area which is divided into a plurality of local service areas, each of which is identified by a unique area code. The system comprises a central controller located in each of the local service areas for transmitting a pre-registration polling signal containing a unique area code of the own local service area at periodic intervals. Each of a plurality of cordless telephones receives the pre-registration polling signal and transmits a pre-registration response signal if the area code contained in the received polling signal mismatches a unique area code stored therein. The central controller responds to the pre-registration response signal by making a registration of a cordless telephone and transmitting an acknowledgement signal. The acknowledgement signal is received by the registered cordless telephone and the area code stored therein is updated with an area code contained in the acknowledgement signal. A post-registration signal transmitted from the registered telephone at periodic intervals. The central controller detects the post-registration signal and cancelling the registration in the absence of the detected post-registration signal for a prescribed time interval.

Specifically, each of the local areas accommodates a plurality of home position portable cordless telephones each having a corresponding line terminal in a telephone switching system such as PBX or public switched telephone network and a multi-channel access facility for establishing a two-way radio link with one of access units located at key points of each area. Each of the telephones receives a pre-registration polling signal and returns a pre-registration response signal if a unique code contained in the received pre-registration polling signal mismatches a stored unique area code. A controller is provided in each local area to transmit the pre-registration polling signal through the access units to elicit a pre-registration response signal. If available, a reserved line terminal of the switching system is assigned to a non-registered telephone in response to receipt of the pre-registration response signal and this cordless telephone is registered in memory. The controller then transmits an acknowledgement signal upon completion of a registration to elicit post-registration signals at periodic intervals from the registered telephone and monitors the post-registration signal. The registration is cancelled if the controller fails to receive the post-registration signal for a prescribed time interval and the assigned telephone number is freed. A pre-dialing switching stage establishes a connection between the access units and line terminals of the telephone switching system during call setup process.

BRIEF DESCRIPTION OF THE DRAWINGS

The present invention will be described in further detail with reference to the accompanying drawings, in which.

DETAILED DESCRIPTION

Figure 1:
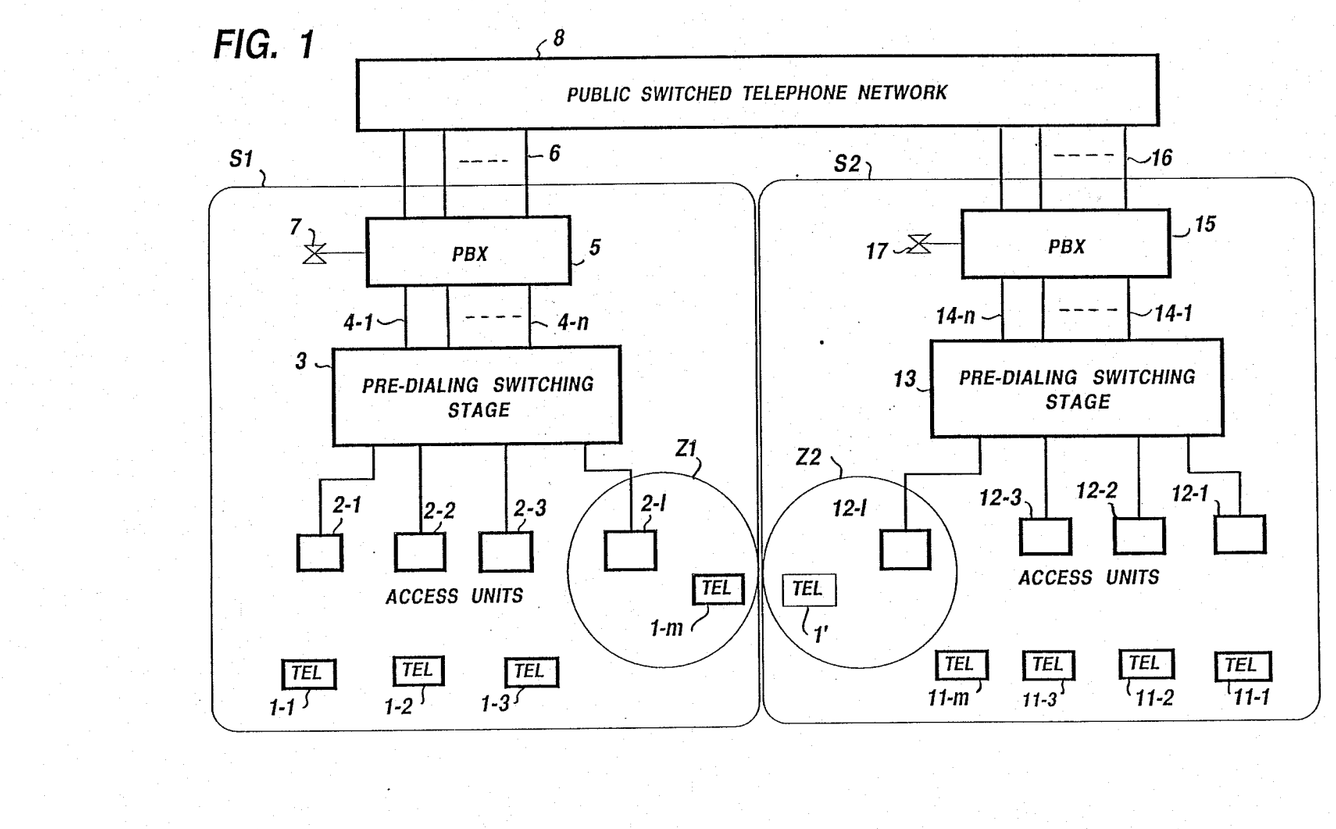
FIG. 1 is a block diagram of a wide area cordless telephone system of the present invention.

Referring now to FIG. 1, a wide area cordless telephone system of the present invention covers a service area which is divided into local service areas each being identified by uniquely assigned area identification codes. For purposes of simplicity, only two local service areas S1 and S2 are illustrated. Each local area covers a premises of a corporate, for example, and accommodates home position portable cordless telephones and several non-home position cordless telephones which belong to other local areas. Specifically, the local area S1 accommodates home position telephones 1-1 through 1-$m$ and the local area S2 accommodates home position telephones 11-1 through 11-$m$. Within the local area S1 are located a plurality of fixed radio access units 2-1 through 2-$l$ to define access zones Z. Radio access units 2-1 through 2-*l* are connected through a pre-dialing switching stage 3 to a private branch exchange (PBX) 5 and thence to a public switched telephone network 8 through exchange lines 6. PBX telephones 7 may also be connected to the PBX 5. Pre-dialing switching stage 3 is connected by PBX lines 4-1 through 4-*n* to the line terminals of the PBX 5, where $n>m>l$. Among the n line terminals, m line terminals are assigned permanently to home position cordless telephones 1-1 through 1-*m*, and (*n-m*) PBX line terminals are reserved for non-home position cordless telephones. Each radio access unit 2 has a multi-channel access facility to access any of the cordless telephones located within the own access zone Z. Each cordless telephone is also provided with the same multi-channel access facility to establish a two-way radio channel with any of the access units 2. With a two-way radio channel being established between a given cordless telephone and a nearby access unit 2, the pre-dialing switching stage 3 proceeds to set up a connection between the access unit and a PBX line terminal associated with that given cordless telephone.

In the local area S2, radio access units 12-1 through 12-*l* are provided in a manner similar to area S1 to establish communication with home position telephones 11-1 through 11-*m* as well as non-home position telephones. Access units 12 are connected to a pre-dialing switching stage 13 which in turn is connected by PBX lines 14-1 through 14-*n* to a PBX 15 to which PBX telephones 17 may also be connected. PBX 15 is also connected by exchange lines 16 to the public switched telephone network 8.

Figure 2:
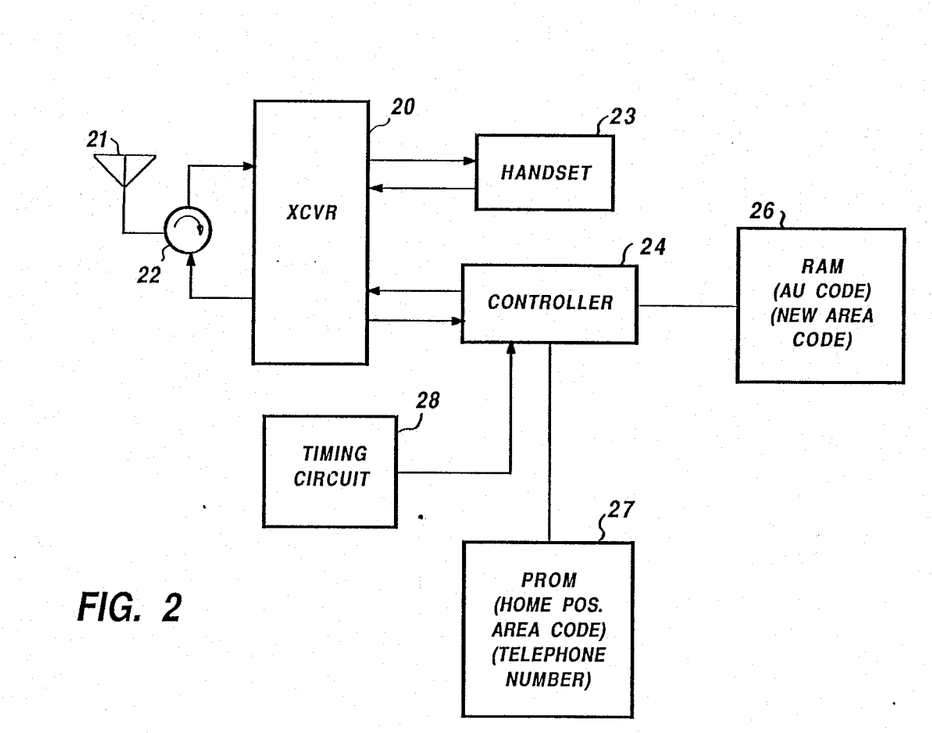
FIG. 2 is a block diagram of each cordless telephone of FIG. 1.

As shown in FIG. 2, each cordless telephone comprises a multi-channel access transceiver 20 and antenna 21 connected thereto through a duplexer 22, the transceiver 20 exchanging control signals with a controller 24 and speech signals with a handset 23. A random access memory 26 is connected to the controller 24 to store a destination service area code and an access unit identification code. A programmable read only memory 27 is also associated with the controller 24 to store the area code of a local area in which the telephone is located and a telephone number assigned to the own cordless telephone. Further included is a timing circuit 28 which causes the controller 24 to periodically access the memory 26 to read the area code stored therein and further access the memory 27 to read the telephone number stored therein and transmits an identification signal to a nearby access unit at periodic intervals. Controller 24 includes a function with which it responds to a "Pre-registration Polling" signal or "Post-registration Polling" signal. As will be described, these signals are periodically sent from the access units to the telephones to cause it to compare between the local area code contained in such polling signals and the current local area code stored in the memory 26 and returns a "Pre-registration Response" signal when a mismatch occurs between these area codes or a "Post-registration Response" signal after the telephone has been registered.

Figure 3:
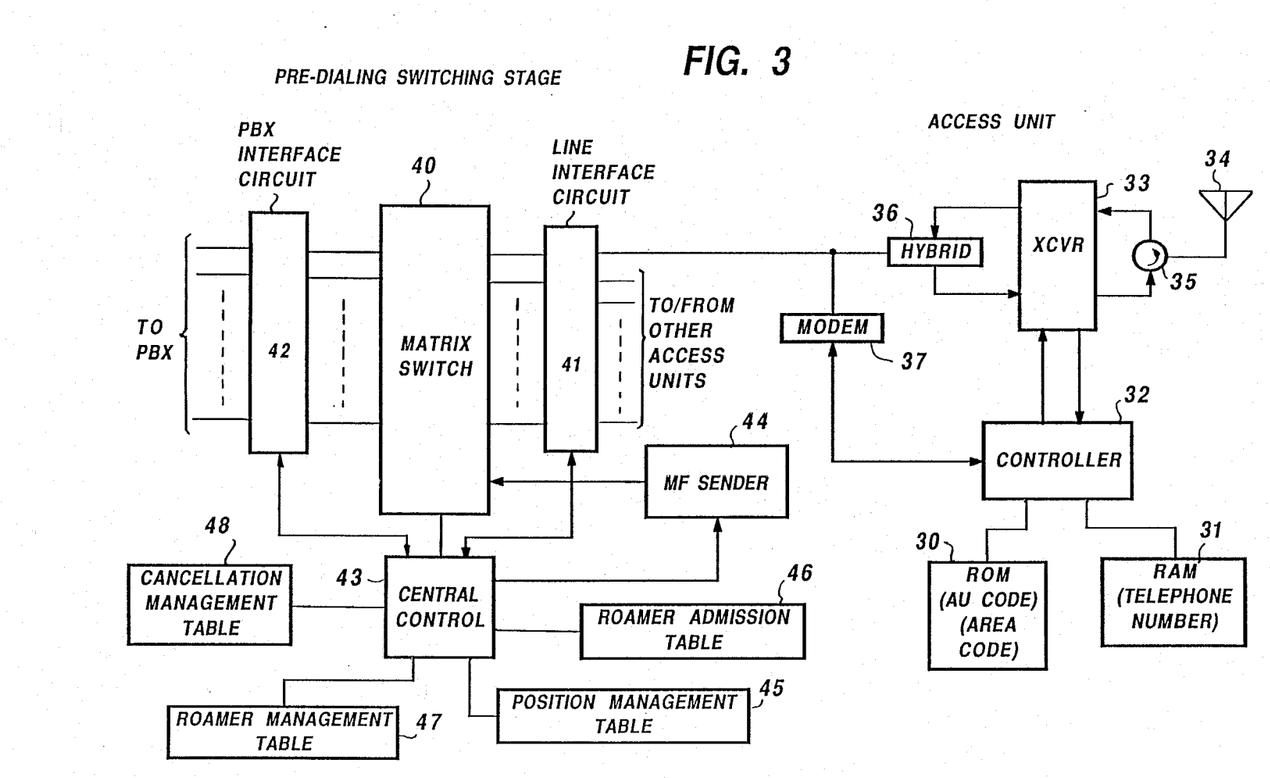
FIG. 3 is a block diagram of each radio access unit and a pre-dialing switching stage of FIG. 1.

In FIG. 3, each of the radio access units 2 and 12 and each of the associated pre-dialing switching stages 3 and 13 are illustrated. Each access unit comprises a read only memory 30 in which the identification code of the own access unit and the identification code of the own local area are stored. A random access memory 31 is provided for storing one or more telephone numbers of cordless telephones with which it has established radio links. The data stored in the read only memory 30 are recalled by a controller 32 when the access unit receives a call request signal or any other control signals from a cordless telephone and the recalled data are sent to the associated pre-dialing switching stage through a modem 37. The data stored in the random access memory 31 is recalled whenever a call is originated from the cordless telephone or a call is terminated thereto. Controller 32 is connected to a multi-channel access transceiver 33 to exchange control data with cordless telephones through duplexer 35 and antenna 34 over a two-way frequency modulation radio channel. Speech signals are transmitted over an established channel and a hybrid 36 to the pre-dialing switching stage.

Each of the pre-dialing switching stages 3 and 13 comprises a digital matrix switch 40 having an array of access terminals connected through a line interface circuit 41 to the associated access units 2 or 12 and an array of PBX terminals connected through a PBX interface circuit 42 to the line terminals of the PBX 5 or 15. A central controller 43 establishes a dialing connection in the matrix switch 40 from a multi-frequency sender 44 to a desired PBX line terminal in response to an outgoing call request signal which the sender 44 receives through the line interface circuit 41 from a calling cordless telephone. With the dialing connection being established, the sender 44 transmits a multi-frequency dialing signal to the associated PBX. Upon completion of a dialing procedure, the central controller 43 proceeds to release the dialing connection and establishes a talking connection between the access unit associated with the calling telephone and the desired PBX line terminal. When an incoming call is directed to a cordless telephone, an incoming call request is applied from a PBX line terminal through the PBX line interface circuit 42 to the central controller 43 to cause it to establish a ringing connection from that PBX line terminal to an access unit associated with the called cordless telephone.

Pre-dialing switching stages 3 and 13 further include memories 45, 46 and 47. Memory 45 is a position management table in which the central controller 43 creates a record establishing a relational link between a file storing the identification of a cordless telephone and a file storing the identification of an access unit with which that cordless telephone is associated. Memory 46 is a roamer admission table in which the central controller 43 creates a record indicating the amount of cordless telephones already registered in the own local area. This record is accessed by the central controller 43 to determine if a reserved PBX line is available for a new cordless telephone roaming into the own local area. If available, the central controller 43 assigns the reserved PBX line to the new cordless telephone. Memory 47 is a roamer management table in which the central controller 43 creates a record establishing a relational link between a first file storing the identification code of a roaming telephone, a second file storing the identification code of an access unit associated with that roaming telephone and a third file storing a PBX telephone number assigned to that telephone. Central controller 43 accesses the roamer management table 47 whenever an outgoing call is originated from a registered cordless telephone or an incoming call is received from the PBX.

Each pre-dialing switching stage further includes a cancellation management table 48. As will be understood later, the cancellation management table 48 stores time lapse information indicating a time lapse between successive confirmation or response signals sent from each registered telephone to permit the central controller 43 to cancel registration if the time lapse exceeds a predetermined value, recognizing that a registered telephone is leaving the own local area.

Figure 4:
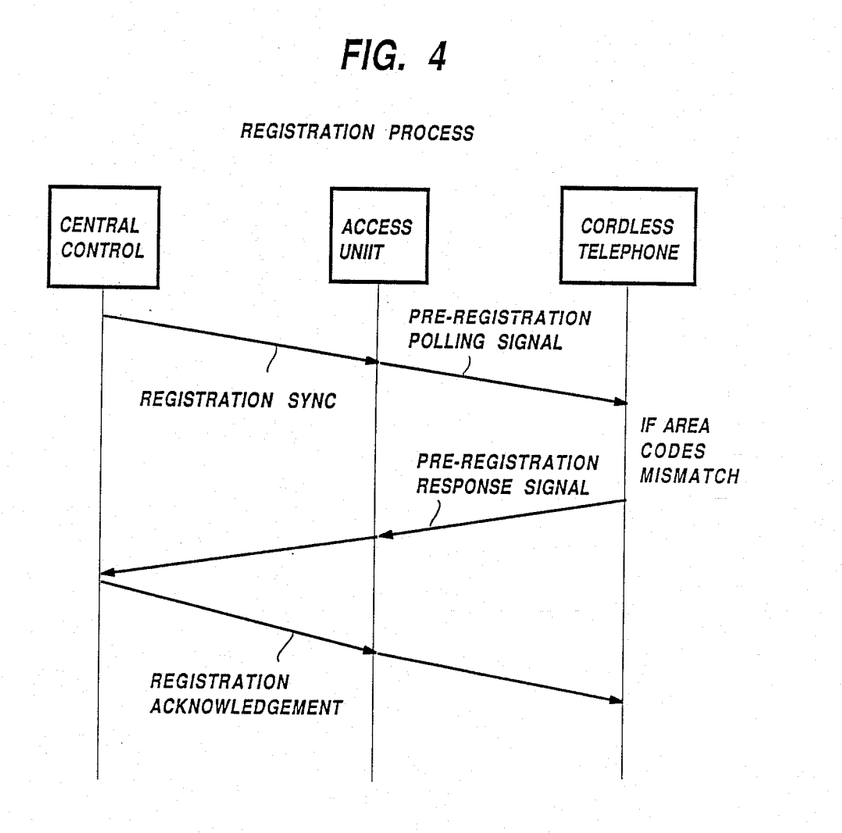
FIG. 4 is a flow diagram illustrating the flow of control signals during the process of registration.
Figure 5:
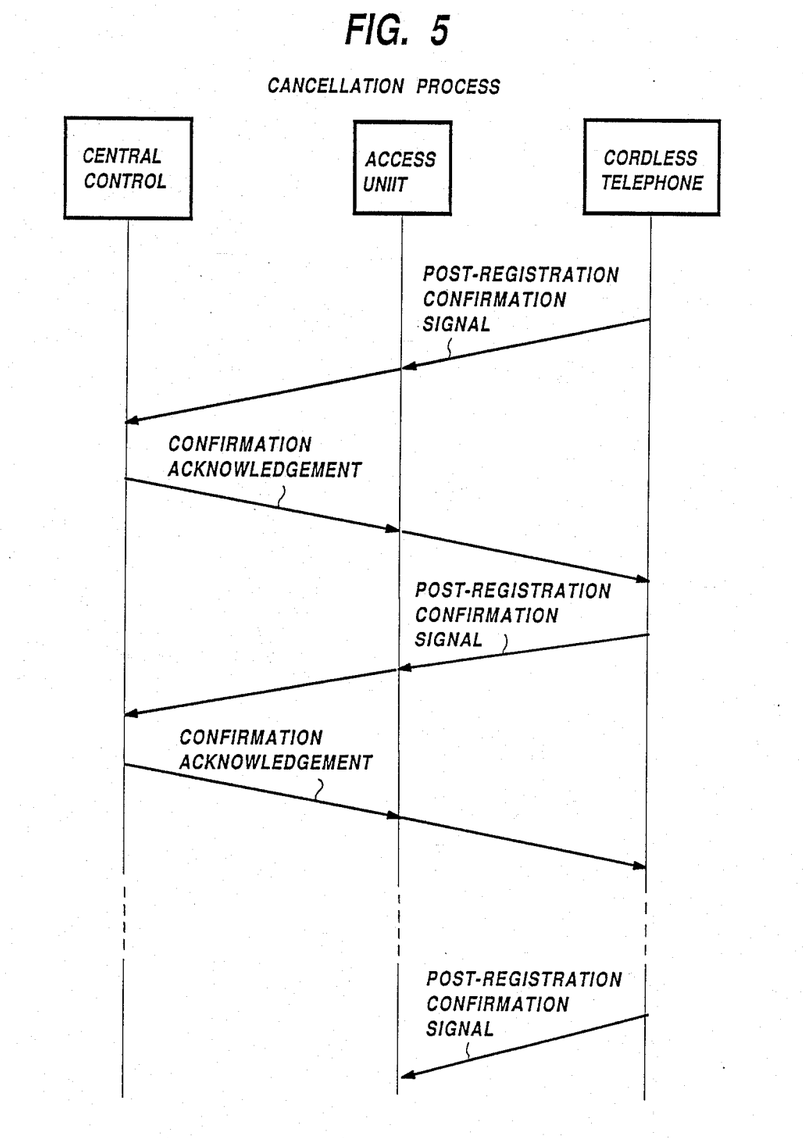
FIG. 5 is a flow diagram according to one embodiment of the invention showing the flow of control signals during the process of cancellation.
Figure 6:
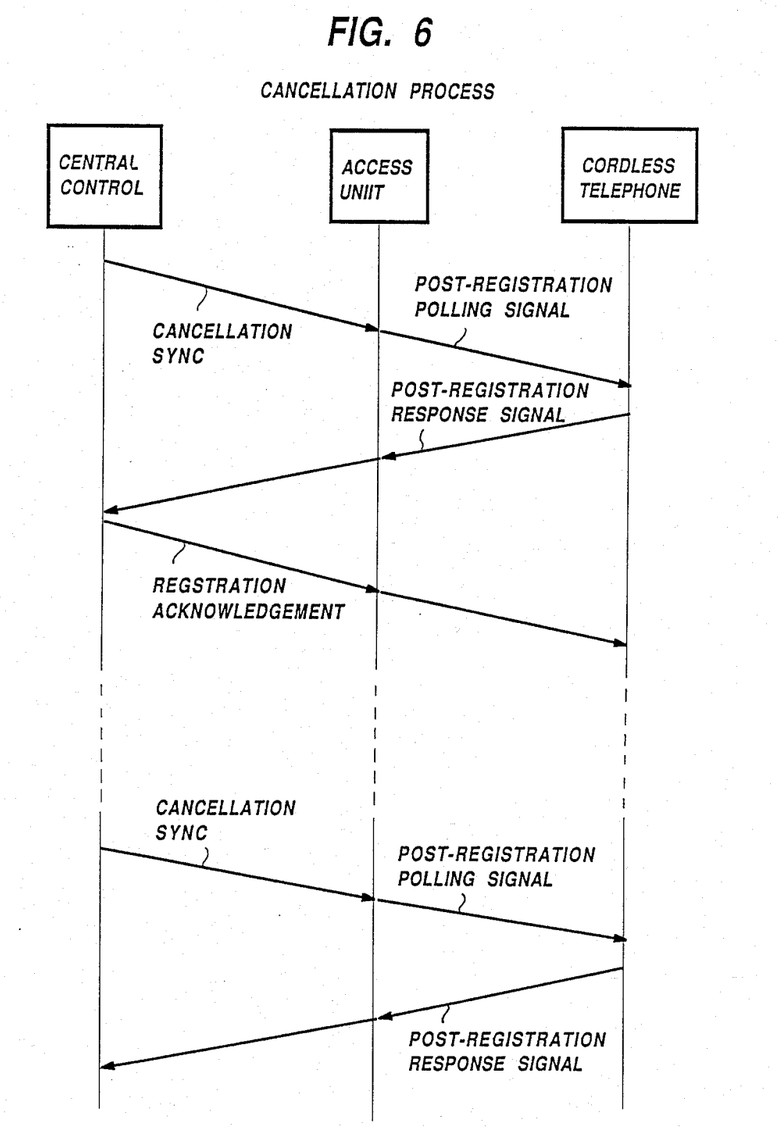
FIG. 6 is a flow diagram according to an alternative embodiment shown the flow of control signals during the process of cancellation.

For a better understanding of the present invention, reference is made to FIGS. 4 to 6. FIG. 4 illustrates a process according to which control signals are exchanged between a non-registered cordless telephone and the central controller 43 of a destination area through an associated access unit to make a registration of that telephone. First, the central controller 43 of the destination local area periodically transmits a sync pulse to the 43 of the destination local area periodically transmits a sync pulse to the controller 32 of all the access units to cause it to broadcast a "Pre-registration Polling" signal containing the identification code of the own local area. On receiving the "Pre-registration Polling" signal, a cordless telephone entering the destination area detects a match or mismatch between the identification code contained in the received polling signal and the identification code currently stored in the random access memory 26, FIG. 2. If a match is detected, the controller 26 recognizes that the telephone has already been registered in the local area and returns no response to the "Pre-registration Polling" signal. If a mismatch is detected, the controller 26 recognizes that the polled telephone has not yet been registered and returns a "Pre-registration Response" signal containing the identification code of the telephone stored in the programmable read only memory 27 and the area code and access unit code stored in the memory 26. Controller 32 of the associated access unit decodes this Pre-registration Response signal and stores the received identification code of the telephone into the random access memory 31 and relays the necessary information to the central controller 43 through line interface circuit 41. If the polled telephone is not a non-home position telephone, central controller 43 accesses the tables 45, 46 and 47 in sequence to determine if a reserved PBX line is available, and if it is, assigns a reserved telephone number to the polled telephone and makes a registration in the tables 45, 46 and 47. If the polled telephone is a home position cordless telephone, central controller 43 recognizes that it has returned to the own local area and accesses the position management table 45 to update the information concerning that home-position telephone. In either case, the central controller 43 then proceeds to return a "Registration Acknowledgement" signal through the associated access unit to the polled telephone. In this way, a roaming telephone is registered in a non-home position local area.

FIG. 5 illustrates an embodiment of the present invention according to which control signals are exchanged between a registered cordless telephone and the central controller 43 to make certain whether it is leaving the own local area and if it is, the central controller 43 proceeds with the cancellation of the registration of that telephone. In this embodiment, the controller 24 of the registered telephone responds to the timing signal supplied from the timing circuit 28 to transmit a "Post-registration Confirmation" signal at periodic intervals, which contains the same information as the Pre-Registration Response signal. This Post-registration Confirmation signal is relayed by the associated access unit and applied to the central controller 43. On receiving the Post-registration Confirmation signal, the central controller 43 checks it against the information stored in the tables 45, 46 and 47. If they match, the central controller 43 recognizes that the telephone of interest is still within the own local area and proceeds to return a "Confirmation Acknowledgement" signal. On receiving the Confirmation Acknowledgement signal, the controller 24 of the registered telephone writes the contents of the Confirmation Acknowledgement signal into the memory 26. Central controller 43 includes a counter to detect the amount of time lapsed between successive Post-registration Confirmation signals and stores time lapse data into the cancellation management table 48 and periodically updates and checks the stored data against a reference value. If a registered telephone remains in a local area, Post-registration Confirmation signal is repeatedly transmitted and so the time lapse does not exceed the reference value. If the reference value is exceeded, the central controller 43 recognizes that a registered telephone is leaving the own local area and cancels the registration records in the tables 45 to 48.

An alternative embodiment is shown in FIG. 6. In this embodiment, a "Post-registration Polling" signal is periodically transmitted from the central controller 43 to each registered telephone to request a "Post-registration Response" signal therefrom. Central controller 43 detects the time lapse between successive Post-registration Response signals returned from each registered telephone and stores it into the cancellation management table 48 and periodically checks the stored time lapse data with a reference time interval. As in the FIG. 5 embodiment, the expiry of the reference time interval indicates that a registered telephone is leaving a local area and cancels the registration records in the tables 45 to 48.

Therefore, if cordless telephone 1-$m$ roams into the access zone Z2 of access unit 12-1 as shown at 1' in FIG. 1, leaving the zone Z1 in which it has been registered, the process of FIG. 4 begins in local area S2 so that telephone 1-$m$ receives a Pre-registration Polling signal and detects a mismatch between the local area code contained in the received polling signal and the area code stored in it and returns a Pre-registration Response signal to the access unit 12-$l$, informing it of the telephone number. In response to this Pre-registration Response signal, the central controller 43 of pre-dialing switching stage 13, assigns a reserved PBX line if available and proceeds with the registration of the telephone 1-$m$. The process of FIG. 5 has already begun before telephone 1-$m$ leaves the zone Z1 so that it has continued transmitting a periodic Post-registration Confirmation signal to the access unit 2-$l$, eliciting Confirmation Acknowledgement signals from the pre-dialing switching stage 3. When telephone 1-$m$ enters the zone Z2, the access unit 2-$l$ fails to receive the Post-registration Confirmation signal and the central controller 43 of local area S1 proceeds with the cancellation of the registration of telephone 1-$m$. Alternatively, the access unit 2-l periodically transmits a Post-registration Polling signal to it to elicit a Post-registration Response signal in accordance with the process of FIG. 6 to determine the cancellation of telephone 1-$m$.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A method for making a registration of a roaming cordless telephone in one of a plurality of local service areas and cancelling the registration, each of said service areas being identified by a unique area code and having a central controller, comprising:
   (a) transmitting a pre-registration polling signal from said central controller at periodic intervals, said polling signal containing a unique area code identifying the own local service area;
   (b) receiving said polling signal at said roaming cordless telephone and transmitting a pre-registration response signal from said cordless telephone when said area code contained in said received polling signal mismatches a unique area code stored in said telephone;
   (c) making a registration of said cordless telephone in said central controller in response to said pre-registration response signal and transmitting an acknowledgement signal;
   (d) receiving said acknowledgement signal at said cordless telephone, updating said stored area code with an area code contained in said acknowledgement signal and transmitting a post-registration signal from said cordless telephone at periodic intervals; and
   (e) detecting said post-registration signal at said central controller and cancelling said registration in the absence of the detected post-registration signal for a prescribed time interval.

2. A wide area cordless telephone system for covering a service area which is divided into a plurality of local service areas, each of said service areas being identified by a unique area code, comprising:
   a central controller located in each of said local service areas for transmitting a pre-registration polling signal containing a unique area code of the own local service area at periodic intervals;
   a plurality of cordless telephones, each having means for receiving said pre-registration polling signal and transmitting a pre-registration response signal if said area code contained in the received polling signal mismatches a unique area code stored therein, updating the stored area code with an area code contained in an acknowledgement signal received from said central controller, and transmitting a post-registration signal at periodic intervals upon receipt of said acknowledgement signal;
   said central controller including means for making a registration of a cordless telephone in response to said pre-registration response signal and transmitting said acknowledgement signal and detecting said post-registration signal and cancelling said registration in the absence of the detected post-registration signal for a prescribed time interval.

3. A wide area cordless telephone system for covering a service area which is divided into a plurality of local service areas identified respectively by unique codes, comprising for each of said local service areas:
   a plurality of home position portable cordless stations each having a corresponding line terminal in a telephone switching system and a multi-channel access means for establishing a two-way radio link, each of said telephones having means for receiving a pre-registration polling signal and transmitting a pre-registration response signal if a unique code contained in the received pre-registration polling signal mismatches a stored unique code identifying the own local area and transmitting a post-registration signal at periodic intervals upon receipt of an acknowledgement signal;
   a plurality of fixed access units for establishing said radio link with each of said home position cordless stations and non-home position cordless stations belonging to another local area; and
   a pre-dialing switching stage for establishing a connection between said access units and line terminals of said telephone switching system, said switching stage including control means connected to said access units for transmitting said pre-registration polling signal through said access units to permit said home position and non-home position cordless stations to return said pre-registration response signal, assigning a reserved line terminal of said switching system to the registered cordless station, making a registration of a said cordless station in response to receipt of said pre-registration response signal therefrom, transmitting said acknowledgement signal upon registration of said telephone and cancelling said registration if said post-registration signal is not received from said registered telephone for a prescribed time interval.

4. A wide area cordless telephone system as claimed in claim 3, wherein each of said cordless stations includes means for transmitting said post-registration signal at periodic intervals, and wherein said controller includes means for determining a time lapse between successive ones of said making a registration of a said cordless station in response to receipt of said pre-registration response signal, post-registration signals and detecting when said time lapse exceeds said prescribed time interval to perform said cancellation.

5. A wide area cordless telephone system as claimed in claim 3, wherein said controller includes means for transmitting a post-registration polling signal and wherein each of said cordless stations returns a post-registration response signal on receiving said post-registration polling signal, wherein said controller further includes means for determining a time lapse between successive ones of said post-registration response signal and detecting when said time lapse exceeds said prescribed time interval to perform said cancellation.

* * * * *